United States Patent
Tu et al.

(10) Patent No.: US 8,769,182 B1
(45) Date of Patent: Jul. 1, 2014

(54) VIRTUAL TAPE LIBRARY WITH THE ABILITY TO PERFORM MULTIPLE, SIMULTANEOUS READS OF A SINGLE VIRTUAL TAPE

(75) Inventors: Sean Tu, Eagan, MN (US); Wendy A. Shavor, Shoreview, MN (US); James H. Harris, Jr., Woodbury, MN (US)

(73) Assignee: Symantec Corporation, Mountain View, CA (US)

( * ) Notice: Subject to any disclaimer, the term of this patent is extended or adjusted under 35 U.S.C. 154(b) by 462 days.

(21) Appl. No.: 12/752,970

(22) Filed: Apr. 1, 2010

(51) Int. Cl.
G06F 3/06 (2006.01)
G06F 13/00 (2006.01)

(52) U.S. Cl.
USPC .................. 711/4; 711/111; 711/161

(58) Field of Classification Search
None
See application file for complete search history.

(56) References Cited

U.S. PATENT DOCUMENTS

| | | | |
|---|---|---|---|
| 2008/0040723 A1* | 2/2008 | Haustein et al. | 718/104 |
| 2008/0046670 A1* | 2/2008 | Lam | 711/161 |
| 2008/0077758 A1* | 3/2008 | Ohmido | 711/162 |
| 2008/0162813 A1* | 7/2008 | Haustein et al. | 711/115 |
| 2008/0222344 A1* | 9/2008 | Upadhyayula | 711/4 |
| 2009/0063765 A1* | 3/2009 | Kottomtharayil et al. | 711/112 |
| 2009/0077309 A1* | 3/2009 | Slater et al. | 711/111 |
| 2009/0132775 A1* | 5/2009 | Otani et al. | 711/162 |
| 2011/0066799 A1* | 3/2011 | Gold | 711/111 |

* cited by examiner

Primary Examiner — Sean D Rossiter
(74) Attorney, Agent, or Firm — Brill Law Office; Jeffrey Brill (57) ABSTRACT

A virtual tape library management system provides multiple, simultaneous accesses to the content stored on a single virtual tape. The virtual tape library management system receives a first request to access the content of a virtual tape. Responsive to the first request, the virtual tape library management system provides access to the virtual tape. While the virtual tape is being accessed, the virtual tape library management system receives a second request to read the same virtual tape. In response, the virtual tape library management system creates a shadow virtual tape corresponding to the virtual tape, maps the shadow virtual tape to the content of the virtual tape, and provides access to the shadow virtual tape.

15 Claims, 4 Drawing Sheets

VIRTUAL TAPE LIBRARY WITH THE ABILITY TO PERFORM MULTIPLE, SIMULTANEOUS READS OF A SINGLE VIRTUAL TAPE

TECHNICAL FIELD

This disclosure pertains generally to virtual tape libraries, and more specifically to proving a virtual tape library with the ability to perform multiple, simultaneous reads of a single virtual tape.

BACKGROUND

In computer storage, a tape library is a storage device which contains one or more tape drives, a number of slots to hold tapes, a barcode reader to identify tapes, and automated means for loading tapes into tape drives. A tape library can store very large amounts of data, approximately 100,000 times more than a typical hard drive. Although tape libraries can store very large amounts of data, accessing data stored in a tape library is slow compared to accessing data stored on disk. Whereas disks support random access, tapes must be accessed sequentially. In addition, access of data in a tape library typically involves mechanical manipulation of tapes. Despite the slower access, tape libraries are widely used today, primarily for backups and as the final stage of digital archiving. Tape libraries have been in use for a long time, and thus are familiar to many enterprises. A tape library is also much easier to share between multiple hosts than a disk. Additionally, tape storage has historically been less expensive than disk, although the price of disk storage has decreased considerably.

One solution used today to provide the ease and familiarity of use of a tape library with some of the access time advantages of disk storage is a virtual tape library ("VTL"). A VTL uses disk storage, but presents a tape library interface, thereby simulating a tape library for use by existing backup platforms (e.g., software packages). In other words, a backup platform configured to use a tape library can use a VTL, which provides an interface simulating a physical tape library, but actually uses disk storage to store data. The benefits of such virtualization include faster data access and physical consolidation of storage.

Despite providing faster access times, there is one important advantage of disk storage that conventional VTLs lack. When accessing disk storage as a disk (as opposed to a virtual tape, in the context of VTL), fragments on the disk can be read simultaneously by multiple processes. On the other hand, a tape cannot be read by more than one source at the same time. Because VTLs provide virtual tape and tape drives, conventional VTLs have this same limitation as physical tape libraries. In other words, under a VTL, only one source can access any given virtual tape at a time. This can become a bottleneck in a backup application, when it requests the same tape for a restore operation and for a duplication operation. One of the requests has to wait until the tape is released by the other and thus free for access.

Published United States Patent Application 20090063765 describes a VTL in which a single virtual tape can be accessed simultaneously by multiple processes. However, the system described in United States Patent Application 20090063765 requires reconfiguring the Small Computer System Interface ("SCSI") layer. At best, this solution would require a complicated, difficult implementation. At worst, it could require adoption of a new definition of SCSI by the entire tape library community, which is simply not practical.

It would be desirable to address these issues.

SUMMARY

A virtual tape library management system provides multiple, simultaneous accesses to the content stored on a single virtual tape. The virtual tape library management system receives a first request from an application (e.g., a backup system) to access the content of a specific virtual tape. Responsive to the first request, the virtual tape library management system provides the application with access to the specific virtual tape. While the application is accessing the specific virtual tape, the virtual tape library management system receives a second request from the application to read the content of the same specific virtual tape. In response to the second request, the virtual tape library management system provides the application with read access to a shadow virtual tape comprising the content of the specific virtual tape, while the application is simultaneously accessing the specific virtual tape. Thus, the application accesses the virtual tape and the shadow virtual tape simultaneously. The first and second requests can be, for example, a request to duplicate the virtual tape and a request to restore the virtual tape.

The virtual tape library management system creates a shadow virtual tape corresponding to the specific virtual tape, and maps the shadow virtual tape to the content of the specific virtual tape. Thus, the specific virtual tape and the corresponding shadow virtual tape are both mapped to the same content stored on disk. The virtual tape library management system then provides an identifier of the shadow virtual tape to the application. The virtual tape library management system can also provide the application with access to a shadow virtual tape drive configured for mounting and reading the shadow virtual tape. In some embodiments, if no shadow virtual tape drive is available, the virtual tape library management system instead provides the application with access to a standard virtual tape drive for accessing the shadow virtual tape. Once the application is done accessing the shadow virtual tape, the virtual tape library management system can delete the shadow virtual tape.

Put in other words, responsive to the first request, the virtual tape library management system provides the application access to the content on disk to which the specific virtual tape is mapped. Responsive to the second request, the virtual tape library management system maps the shadow virtual tape to the content to which the specific virtual tape is mapped, and simultaneously provides the application access to the content to which the shadow virtual tape is mapped.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
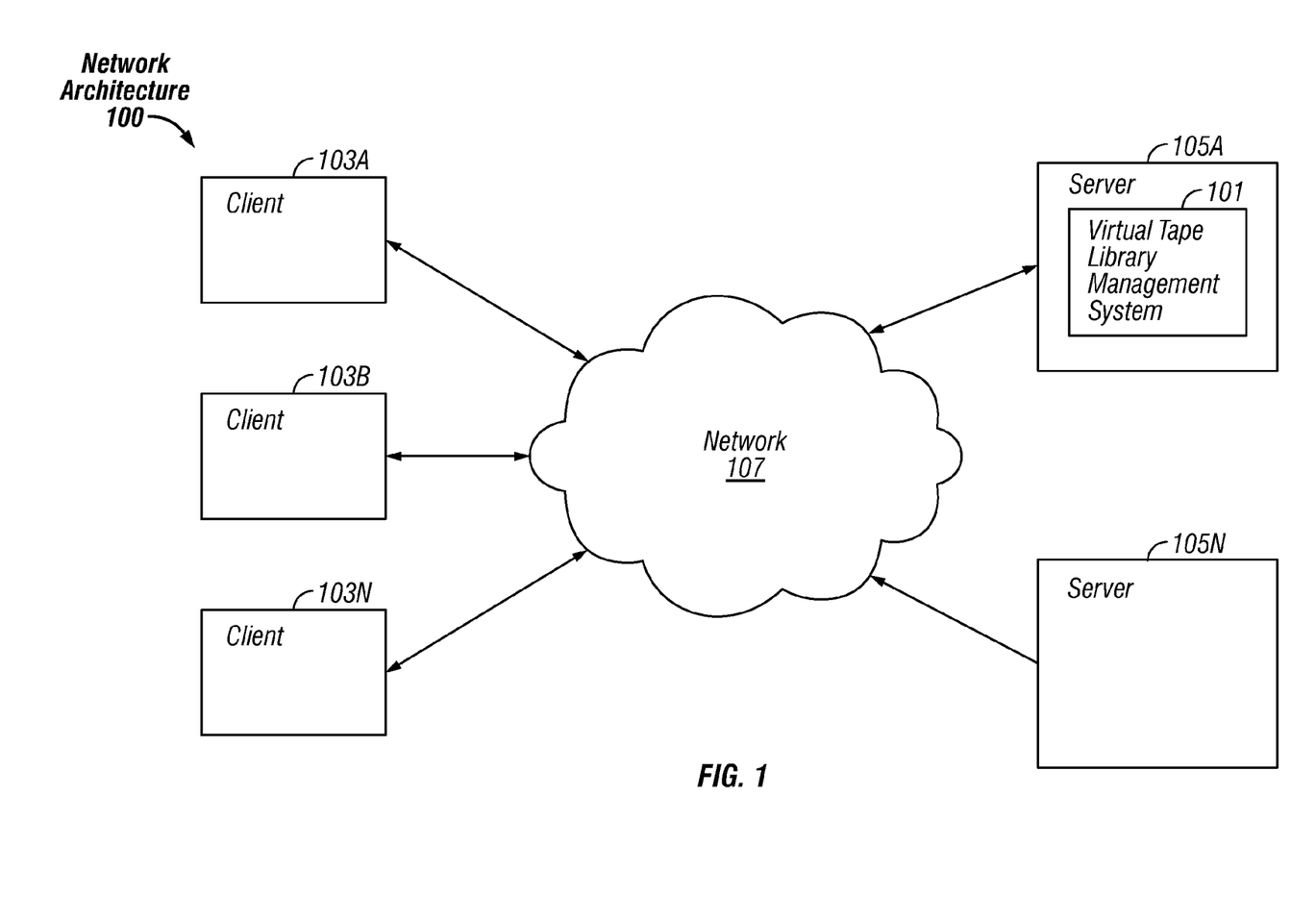
FIG. 1 is a block diagram of an exemplary network architecture in which a virtual tape library management system can be implemented, according to some embodiments.

FIG. 1 is a block diagram illustrating an exemplary network architecture 100 in which a virtual tape library management system 101 can be implemented. The illustrated network architecture 100 comprises multiple clients 103A, 103B and 103N, as well as multiple servers 105A and 105N. In FIG. 1, the virtual tape library management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
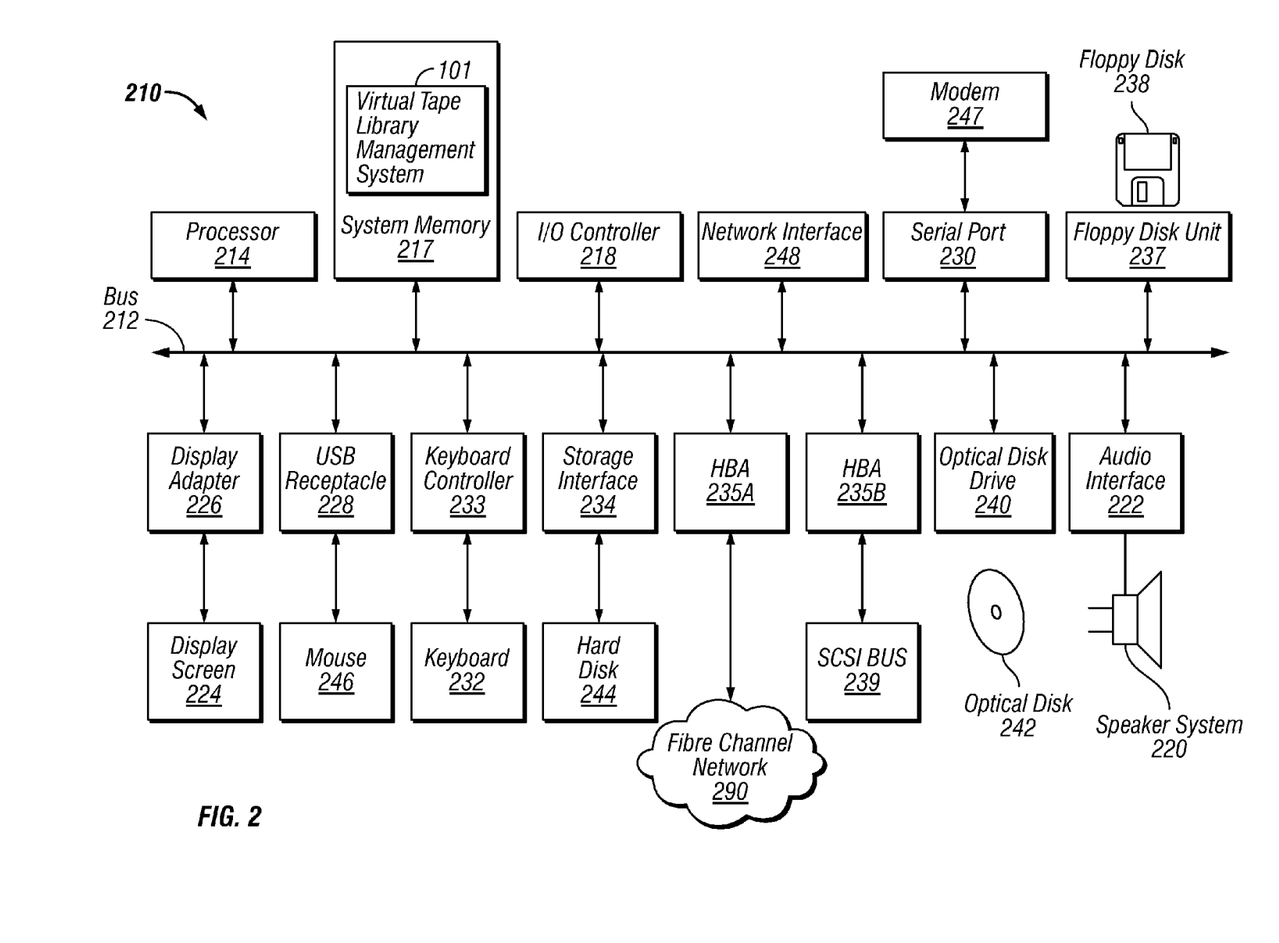
FIG. 2 is a block diagram of a computer system suitable for implementing a virtual tape library management system, according to some embodiments.

FIG. 2 is a block diagram of a computer system 210 suitable for implementing a virtual tape library management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the virtual tape library management system 101 is illustrated as residing in system memory 217. The workings of the virtual tape library management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
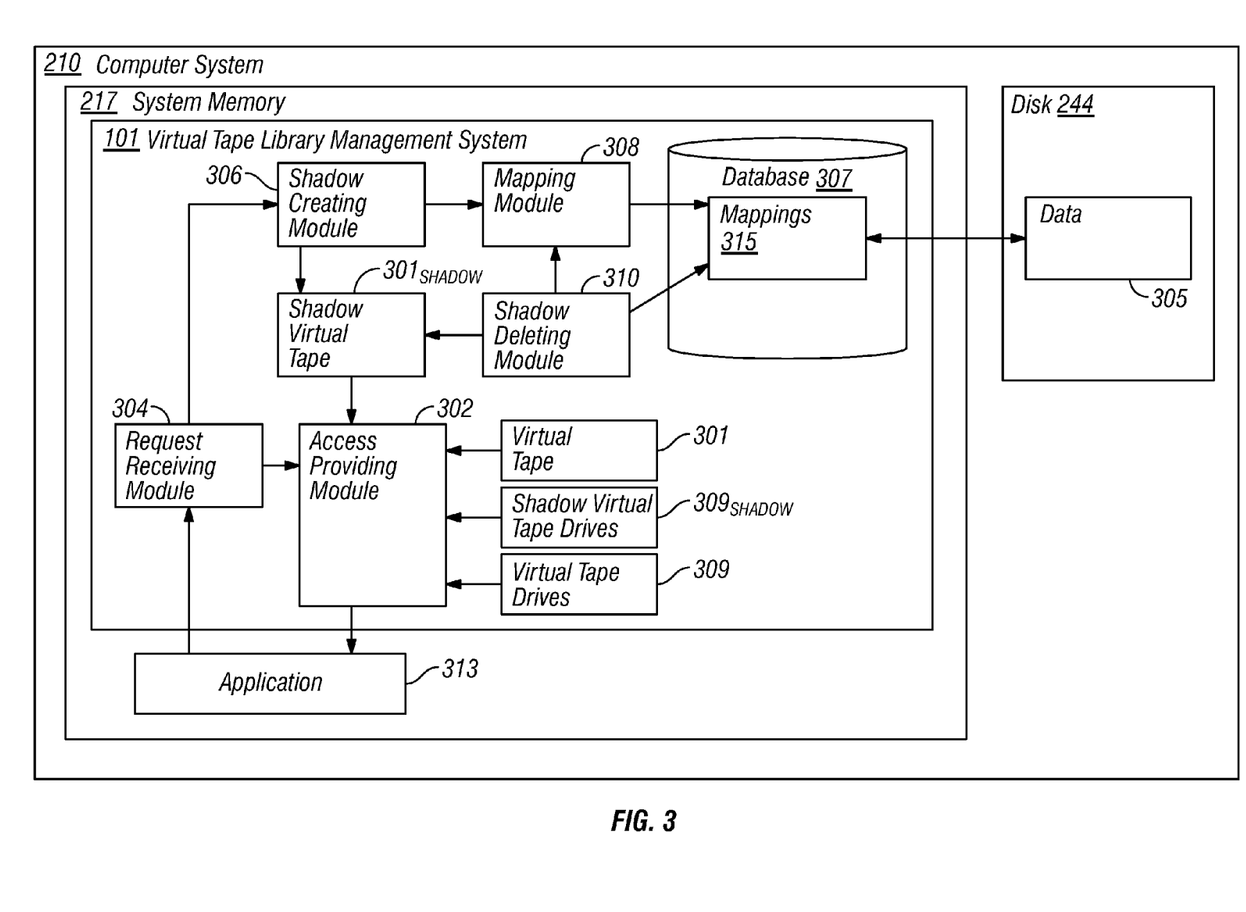
FIG. 3 is a block diagram of the operation of a virtual tape library management system, according to some embodiments.

FIG. 3 illustrates the operation of a virtual tape library management system 101, residing in the system memory 217 of a computer system 210 according to some embodiments. As described above, the functionalities of the virtual tape library management system 101 can reside on a client 103, a server 105, or be distributed between multiple computer systems 210, including within a cloud-based computing environment in which the functionality of the virtual tape library management system 101 is provided as a service over a network 107. It is to be understood that although the virtual tape library management system 101 is illustrated in FIG. 3 as a single entity, the illustrated virtual tape library management system 101 represents a collection of functionalities, which can be instantiated as a single or multiple modules as desired (an instantiation of specific, multiple modules of the virtual tape library management system 101 is illustrated in FIG. 3). It is to be understood that the modules of the virtual tape library management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the virtual tape library management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a virtual tape library management system 101 comprises a VTL with the ability to perform multiple, simultaneous read operations of a single virtual tape 301, without requiring a rewrite or reconfiguration of the SCSI layer. As with a conventional VTL, the virtual tape library management system 101 provides access to multiple virtual tapes 301, each of which is identified by a virtual barcode. As used herein, a virtual barcode can be any type of unique identifier of a virtual tape 301, used in simulation of an actual barcode identifying a physical tape in a tape library. The data 305 stored on a virtual tape 301 is actually stored on an underlying physical medium other than a tape, such as a magnetic or optical disk 244. A database 307 (or other suitable storage mechanism) stores mappings 315 between the various virtual tapes 301 (identified, e.g., by virtual barcode) and the locations at which their data 305 is stored on the disk 244. The data 305 stored on the disk 244 comprising the content of a virtual tape 301 can be thought of as a tape image. It is to be understood that a tape image stored on a disk 244 need not be contiguous.

Also similar to a conventional VTL, the virtual tape library management system 101 provides a plurality of virtual tape drives 309, which can be used by applications (e.g., backup programs) for accessing virtual tapes 301. The virtual tape library management system 101 also provides a plurality of virtual tape slots in which virtual tapes 301 are held. In reality, a virtual tape slot is typically reducible to the address at which the image comprising the virtual tape's data 305 is stored on disk 244, but virtual tape slots simulate the physical tape slots in which physical tapes are held in tape libraries.

Unlike conventional VTLs, an access providing module 302 of the virtual tape library management system 101 also provides shadow virtual tapes $301_{SHADOW}$, shadow virtual barcodes, shadow virtual tape slots and shadow virtual tape drives $309_{SHADOW}$. A shadow virtual tape $301_{SHADOW}$ is simply a virtual tape 301 that "stores" the same data 305 as a virtual tape 301 of which it is a shadow, by being mapped to the same location on the disk 244 at which that data 205 is stored. For example, if a specific virtual tape 301 with a specific virtual barcode "stores" data 305 at a given location on the disk 244 (e.g., is mapped to that location), the corresponding shadow virtual tape $301_{SHADOW}$ would be mapped to the exact same location on the disk 244, thereby storing the same data 305. A shadow virtual tape $301_{SHADOW}$ typically has a virtual barcode similar to that of the corresponding original virtual tape 301, but with an indication that the shadow virtual barcode identifies a shadow virtual tape $301_{SHADOW}$ (e.g., original virtual barcode equals 000001L1, whereas shadow virtual barcode equals 000001S1).

Shadow virtual tape drives $309_{SHADOW}$ are virtual tape drives 309 used for accessing shadow virtual tapes $301_{SHADOW}$. The access providing module 302 of the virtual tape library management system 101 provides a given number of shadow virtual tape drives $309_{SHADOW}$. The number to provide is based on the available resources of the host computer 210. In some embodiments, the number of shadow virtual tape drives $309_{SHADOW}$ to be provided can vary dynamically, based on changing available host level resources. Typically, shadow virtual tape drives $309_{SHADOW}$ can be used only for mounting shadow virtual tapes $301_{SHADOW}$, not standard virtual tapes 301. In some embodiments, shadow virtual tape drives $309_{SHADOW}$ SHADOW are only configured to provide read access to mounted shadow virtual tapes $301_{SHADOW}$ (put another way, in such embodiments, shadow virtual tapes $301_{SHADOW}$ are read only). It is to be understood that the term "shadow" is simply language used to described virtual tape library components for enabling duplicate or "shadow" virtual tapes $301_{SHADOW}$ that are mapped to the same underlying data 305 on disk 244 as their corresponding originals. Other names could be used to describe the same functionality.

Turning now to the use of this shadow functionality to perform multiple, simultaneous read operations of a single virtual tape 301, it is to be understood that the database 307 stores mappings 315 of both standard and shadow virtual tapes 301 to the corresponding underlying data 305 stored on disk 244. When a request receiving module 304 of the virtual tape library management system 101 receives a request from an application 313 to access a virtual tape 301 that is currently being accessed, rather than requiring the application 313 to wait until the current access completes, a shadow creating module 306 of the virtual tape library management system 101 creates a corresponding shadow virtual tape $301_{SHADOW}$, and a mapping module 308 of the virtual tape library management system 101 maps it to the same underlying image stored on disk 244. This mapping 315 is stored in the database 307. The access providing module 302 of the virtual tape library management system 101 makes a shadow virtual tape drive $309_{SHADOW}$ available to the application 313 in order to access the shadow virtual tape $301_{SHADOW}$. Typically, the virtual tape library management system 101 keeps each shadow virtual tape drive $309_{SHADOW}$ locked against read/write/usage until specifically released to an application 313 in response to a request to access a given virtual tape 301 that is being simultaneously accessed by another process.

For simplicity of illustration, in FIG. 3 the application 313 is illustrated as residing on the same computer system 210 as the virtual tape library management system 101. It is to be understood that in some embodiments, the application 313 resides on a separate computer system 210 and communicates with the virtual tape library management system 101 across the network 107. Additionally, in some embodiments the functionality of the application 313 is distributed between multiple computing devices 210. Note that an application 313 using the shadow functionality is aware of the shadow functionality used to enable simultaneous access of individual shadow virtual tapes $301_{SHADOW}$. For example, if an application 313 requests access to a specific virtual tape 301 from the virtual tape library management system 101 but that tape is currently being accessed, the shadow creating module 306 of the virtual tape library management system 101 creates a corresponding shadow virtual tape $301_{SHADOW}$, and the access providing module 302 returns the shadow virtual barcode and shadow virtual slot thereof to the application 313. The application 313 is aware that it has been passed information concerning a shadow virtual tape $301_{SHADOW}$, and thus obtains a shadow virtual tape drive $309_{SHADOW}$ to mount and read it. Typically, the application 313 keeps track of the available number of shadow virtual tape drives $309_{SHADOW}$, SHADOW so that it can know whether one is available. When available, the application 313 can then use a shadow virtual tape drive $309_{SHADOW}$ to mount and access the shadow virtual tape $301_{SHADOW}$.

In some embodiments, standard virtual tape drives 309 can also be used for mounting and accessing shadow virtual tapes $301_{SHADOW}$. In such embodiments, an application 313 uses a shadow virtual tape drive $309_{SHADOW}$ to mount and access a shadow virtual tape $301_{SHADOW}$ if one is available. However, if no shadow virtual tape drive $309_{SHADOW}$ is available, the application 313 can use a standard virtual tape drive 309 for this purpose.

When an application 313 is simultaneously accessing a virtual tape 301 and a corresponding shadow virtual tape $301_{SHADOW}$, the virtual tape library management system 101 actually accesses the same image on the disk 244, but this works because data 305 on disk 244, as opposed to physical tape, can be accessed that way. To facilitate this shadow access, the application 313 keeps track of the original virtual tapes 301 and the number of shadows created. As many shadow virtual tapes $301_{SHADOW}$ as desired can be created, but as described above only a limited number of shadow virtual tape drives $309_{SHADOW}$ exist at any given time, based on the available resources of the host computer 210. It is to be understood that shadow virtual tapes $301_{SHADOW}$ are temporary, and are deleted by a shadow deleting module 310 of the virtual tape library management system 101 after use. In some embodiments, a timeout period is used after which shadow deleting module 310 of the virtual tape library management system 101 automatically deletes all unused shadow virtual tapes $301_{SHADOW}$.

By using the above-described shadow functionality, applications 313 such as backup systems can perform multiple read operations on a single virtual tape 301 simultaneously, for example in the context of simultaneous duplicating and restoring of the same virtual tape 301. By accessing a shadow virtual tape $301_{SHADOW}$, the application 313 can read (and thus duplicate, restore, etc.) data 305 stored on a virtual tape 301 while the original virtual tape 301 is being simultaneously read or even written. Note that the above described shadow functionality in no way requires the reconfiguration, rewriting, redefinition, or other modification of SCSI.

Figure 4:
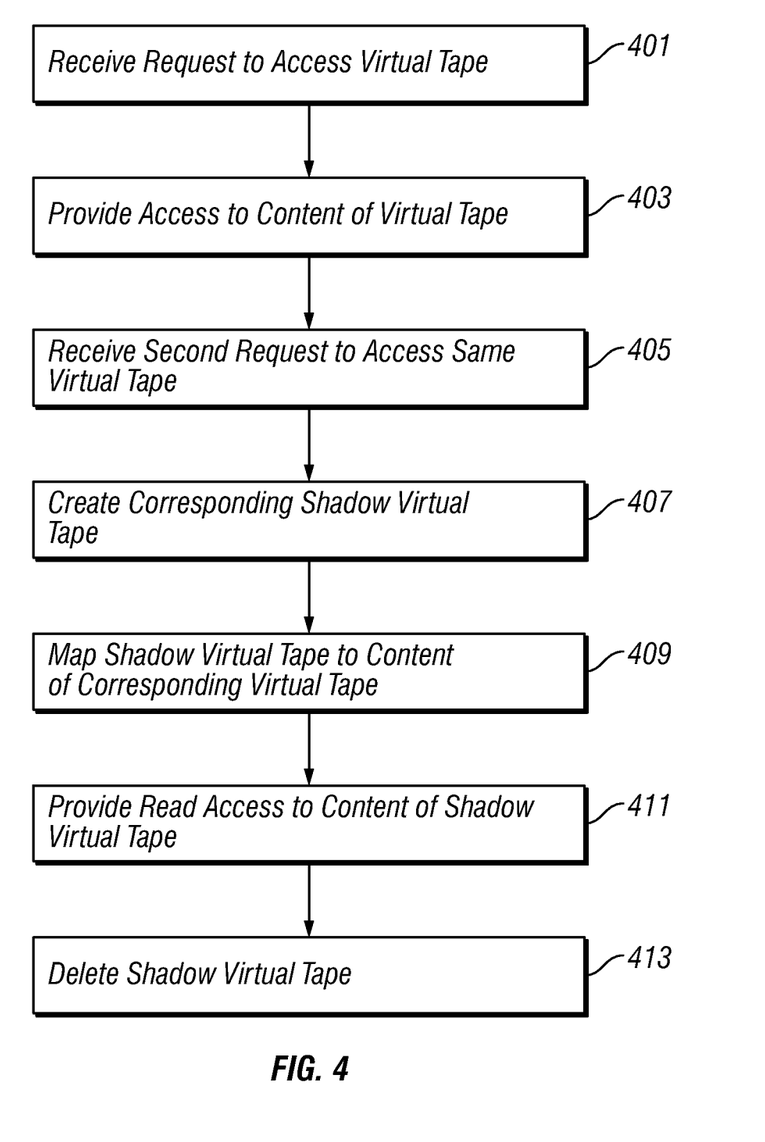
FIG. 4 is a flowchart of the operation of a virtual tape library management system, according to some embodiments.

FIG. 4 illustrates the operation of a virtual tape library management system 101 (FIG. 1), according to some embodiments. A request receiving module 304 (FIG. 3) of the virtual tape library management system 101 (FIG. 1) receives 401 a first request from an application 313 (FIG. 3) to access a specific virtual tape 301 (FIG. 3). Responsive to the first request, an access providing module 302 (FIG. 3) of the virtual tape library management system 101 (FIG. 1) provides 403 the application 313 (FIG. 3) with access to the content of the specific virtual tape 301 (FIG. 3). While the application 313 (FIG. 3) is accessing the specific virtual tape 301 (FIG. 3), the request receiving module 304 (FIG. 3) receives 405 a second request from the application 313 (FIG. 3) to access the same specific virtual tape 301 (FIG. 3). In response to the second request, a shadow creating module 306 (FIG. 3) of the virtual tape library management system 101 (FIG. 1) creates 407 a shadow virtual tape $301_{SHADOW}$ (FIG. 3) corresponding to the specific virtual tape 301 (FIG. 3). A mapping module 308 (FIG. 3) of the virtual tape library management system 101 (FIG. 1) maps 409 the shadow virtual tape $301_{SHADOW}$ (FIG. 3) to the content of the specific virtual tape 301 (FIG. 3). Thus, the specific virtual tape 301 (FIG. 3) and the corresponding shadow virtual tape $301_{SHADOW}$ (FIG. 3) are both mapped to the same content stored on disk 244 (FIG. 2). The access providing module 302 (FIG. 3) then provides 411 the application 313 (FIG. 3) with read access to the shadow virtual tape $301_{SHADOW}$ (FIG. 3) mapped to the same content as the specific virtual tape 301 (FIG. 3), while the application 313 (FIG. 3) is simultaneously accessing the specific virtual tape 301 (FIG. 3). Thus, the application 313 (FIG. 3) accesses the virtual tape 301 (FIG. 3) and the shadow virtual tape $301_{SHADOW}$ (FIG. 3) simultaneously. When the application 313 (FIG. 3) is done accessing the shadow virtual tape $301_{SHADOW}$ (FIG. 3), a shadow deleting module 310 (FIG. 3) of the virtual tape library management system 101 (FIG. 1) deletes 413 the shadow virtual tape $301_{SHADOW}$ (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for a virtual tape library, running on a computer, to provide multiple, simultaneous accesses to content of a single virtual tape, the method comprising the steps of:

receiving a first request from an application to access a specific virtual tape comprising content, by the virtual tape library running on the computer;

responsive to the first request from the application, providing access to the specific virtual tape, by the virtual tape library running on the computer;

during the providing of access to the application to the specific virtual tape, receiving a second request from the application to read the specific virtual tape, by the virtual tape library running on the computer;

responsive to the second request, creating a shadow virtual tape corresponding to the specific virtual tape, by the virtual tape library running on the computer, wherein the shadow virtual tape comprises content of the specific virtual tape, said shadow virtual tape content being stored on a disk;

sending to the application a shadow virtual barcode of the shadow virtual tape, by the virtual tape library running on the computer, wherein the shadow virtual barcode simulates a barcode of a physical tape;

responsive to receiving a read request and the shadow virtual barcode from the application, providing to the application read access to the shadow virtual tape corresponding to the shadow virtual barcode, such that accesses to the virtual tape and the shadow virtual tape are simultaneous; and responsive to the application completing access of the shadow virtual tape, deleting the shadow virtual tape by the virtual tape library running on the computer.

2. The method of claim 1 wherein providing with read access to a shadow virtual tape comprising the content of the specific virtual tape while accessing the specific virtual tape further comprises:

providing a shadow virtual tape slot, by the virtual tape library running on the computer.

3. The method of claim 1 wherein providing read access to a shadow virtual tape comprising the content of the specific virtual tape while accessing the specific virtual tape further comprises:

providing a shadow virtual tape drive to by the virtual tape library running on the computer, said shadow virtual tape drive being configured for mounting and reading the shadow virtual tape.

4. The method of claim 1 wherein providing with read access to a shadow virtual tape comprising the content of the specific virtual tape while accessing the specific virtual tape further comprises:
  responsive to no shadow virtual tape drive being available, providing a standard virtual tape drive for accessing the shadow virtual tape, by the virtual tape library running on the computer.

5. The method of claim 1 wherein providing read access to a shadow virtual tape comprising the content of the specific virtual tape while accessing the specific virtual tape further comprises:
  responsive to the first request, providing the content to which the specific virtual tape is mapped by the virtual tape library running on the computer, said content being stored on a disk;
  responsive to the second request, mapping the shadow virtual tape to the content to which the specific virtual tape is mapped, by the virtual tape library running on the computer, said content being stored on the disk; and
  responsive to the second request, simultaneously providing the content to which the shadow virtual tape is mapped by the virtual tape library running on the computer, said content being stored on the disk.

6. The method of claim 1 further comprising:
  providing a plurality of shadow virtual tape drives by the virtual tape library running on the computer, each of said shadow virtual tape drives being configured for mounting and reading a shadow virtual tape.

7. The method of claim 1 wherein:
  the first request comprises one request from a group of requests consisting of: 1) a request to duplicate the specific virtual tape and 2) a request to restore the specific virtual tape; and
  the second request comprises a different one request from the group of requests.

8. A computer implemented method for simultaneously executing multiple accesses of content of a single virtual tape by a computer, the method comprising the steps of:
  making a first request to a virtual tape library to access a specific virtual tape comprising content, by the computer;
  responsive to the first request, receiving access to the specific virtual tape from the virtual tape library, by the computer;
  while accessing the specific virtual tape, making a second request to the virtual tape library to read the specific virtual tape, by the computer;
  responsive to the second request, receiving a shadow virtual barcode from the virtual tape library for read access to a shadow virtual tape comprising content of the specific virtual tape content, said shadow virtual content being stored on a disk, while accessing the specific virtual tape, by the computer, wherein the shadow virtual barcode simulates a barcode of a physical tape; and
  responsive to sending a read request an the shadow virtual barcode to the virtual tape library, simultaneously accessing the virtual tape and the shadow virtual tape corresponding to the shadow virtual barcode, by the computer, wherein responsive to completing access of the shadow virtual tape, the virtual tape library deletes the shadow virtual tape.

9. The method of claim 8 further comprising:
  receiving a shadow virtual tape drive from the virtual tape library running, by the computer; and
  using the shadow virtual tape drive to mount and read the shadow virtual tape, by the computer.

10. At least one computer readable storage medium storing a computer program product for enabling a virtual tape library to provide multiple, simultaneous accesses to content of a single virtual tape, the computer program product comprising:
  program code for receiving a first request from an application to access a specific virtual tape comprising content, by the virtual tape library running on the computer;
  program code for responsive to the first request from the application, providing access to the specific virtual tape, by the virtual tape library running on the computer;
  program code for during the providing of access to the application to the specific virtual tape, receiving a second request from the application to read the specific virtual tape, by the virtual tape library running on the computer;
  program code for responsive to the second request, creating a shadow virtual tape corresponding to the specific virtual tape, by the virtual tape library running on the computer, wherein the shadow virtual tape comprises content of the specific virtual tape content, said shadow virtual tape content being stored on a disk;
  program code for sending to the application a shadow virtual barcode of the shadow virtual tape, by the virtual tape library running on the computer, wherein the shadow virtual barcode simulates a barcode of a physical tape; and
  program code for responsive to receiving a read request and the shadow virtual barcode from the application, providing to the application read access to the shadow virtual tape corresponding to the shadow virtual barcode, such that accesses to the virtual tape and the shadow virtual tape are simultaneous; and
  program code for responsive to the application completing access of the shadow virtual tape, deleting the shadow virtual tape by the virtual tape library running on the computer.

11. The computer program product of claim 10 wherein the program code for providing read access to a shadow virtual tape comprising the content of the specific virtual tape while the application is accessing the specific virtual tape further comprises:
  program code for providing a shadow virtual tape slot, by the virtual tape library.

12. The computer program product of claim 10 wherein the program code for providing read access to a shadow virtual tape comprising the content of the specific virtual tape while accessing the specific virtual tape further comprises:
  program code for providing a shadow virtual tape drive by the virtual tape library, said shadow virtual tape drive being configured for mounting and reading the shadow virtual tape.

13. The computer program product of claim 10 wherein the program code for providing the application with read access to a shadow virtual tape comprising the content of the specific virtual tape while accessing the specific virtual tape further comprises:
  program code for, responsive to the first request, providing the content to which the specific virtual tape is mapped by the virtual tape library, said content being stored on a disk;
  program code for, responsive to the second request, mapping the shadow virtual tape to the content to which the specific virtual tape is mapped, by the virtual tape library, said content being stored on the disk; and
  program code for, responsive to the second request, simultaneously providing the content to which the shadow virtual tape is mapped by the virtual tape library, said content being stored on the disk.

14. The computer program product of claim 10 further comprising:
program code for providing a plurality of shadow virtual tape drives by the virtual tape library, each of said shadow virtual tape drives being configured for mounting and reading a shadow virtual tape.

15. The computer program product of claim 10 wherein:
the first request comprises one request from a group of requests consisting of: 1) a request to duplicate the specific virtual tape and 2) a request to restore the specific virtual tape; and
the second request comprises a different one request from the group of requests.

* * * * *